(12) United States Patent
Kim (10) Patent No.: US 8,286,666 B2
(45) Date of Patent: Oct. 16, 2012

(54) MIXING PIPE FOR GAS HEATER

(75) Inventor: Chang Hoo Kim, Incheon (KR)

(73) Assignee: Daewoo Electronics Corporation (KR)

( * ) Notice: Subject to any disclaimer, the term of this patent is extended or adjusted under 35 U.S.C. 154(b) by 966 days.

(21) Appl. No.: 12/342,529

(22) Filed: Dec. 23, 2008

(65) Prior Publication Data

US 2009/0170048 A1    Jul. 2, 2009

(30) Foreign Application Priority Data

Dec. 27, 2007  (KR) .................. 10-2007-0139525

(51) Int. Cl.
*F15D 1/04*  (2006.01)

(52) U.S. Cl. .......... 138/44; 138/177; 138/156; 138/151; 138/157; 138/163

(58) Field of Classification Search .............. 138/44, 138/156, 151, 157, 163, 158
See application file for complete search history.

(56) References Cited

U.S. PATENT DOCUMENTS

| | | | | |
|---|---|---|---|---|
| 1,250,160 A | * | 12/1917 | Good | 431/239 |
| 1,333,986 A | * | 3/1920 | Lundgaard | 137/100 |
| 1,559,155 A | * | 10/1925 | Bullock | 73/861.61 |
| 1,744,842 A | * | 1/1930 | Suverkrop et al. | 138/44 |
| 2,790,463 A | * | 4/1957 | Delano et al. | 138/44 |
| 2,795,931 A | * | 6/1957 | Le Foll | 60/39.77 |
| 3,018,799 A | * | 1/1962 | Hartzell et al. | 138/26 |
| 3,326,041 A | * | 6/1967 | Reed | 73/861.64 |
| 4,128,160 A | * | 12/1978 | Deal et al. | 198/657 |
| 4,690,245 A | * | 9/1987 | Gregorich et al. | 181/272 |
| 4,848,409 A | * | 7/1989 | Jahnke, Jr. | 138/110 |
| 5,174,113 A | * | 12/1992 | Deville | 60/309 |
| 5,693,226 A | * | 12/1997 | Kool | 210/541 |
| 5,821,475 A | * | 10/1998 | Morehead et al. | 181/255 |
| 5,918,637 A | * | 7/1999 | Fleischman | 138/44 |
| 6,024,129 A | * | 2/2000 | Schima | 138/44 |
| 6,474,934 B1 | * | 11/2002 | Jahnke et al. | 415/1 |

* cited by examiner

*Primary Examiner* — Patrick F Brinson
(74) *Attorney, Agent, or Firm* — Schmeiser, Olsen & Watts, LLP

(57) ABSTRACT

A mixing pipe for a gas heater includes an intake port through which gas and air are flowed in; a discharge port through which the gas and the air flowed in through the intake port are mixed and discharged; and an acceleration part disposed between the intake port and the discharge port and having a diameter smaller than the a diameter of the intake port, wherein a distance between the intake port and the acceleration part is greater than 0.5 times of the diameter of the acceleration part and smaller than 1.5 times of the diameter of the acceleration part.

9 Claims, 9 Drawing Sheets

PRIOR ART

MIXING PIPE FOR GAS HEATER

CROSS-REFERENCE TO RELATED APPLICATIONS

The present application claims priority to Korean patent application number 10-2007-0139525, filed on Dec. 27, 2007, which is incorporated by reference in its entirety.

BACKGROUND OF THE INVENTION

The present invention relates to a mixing pipe for a gas heater, and more particularly, to a mixing pipe for a gas heater, which can commonly use various fuels.

Figure 1:
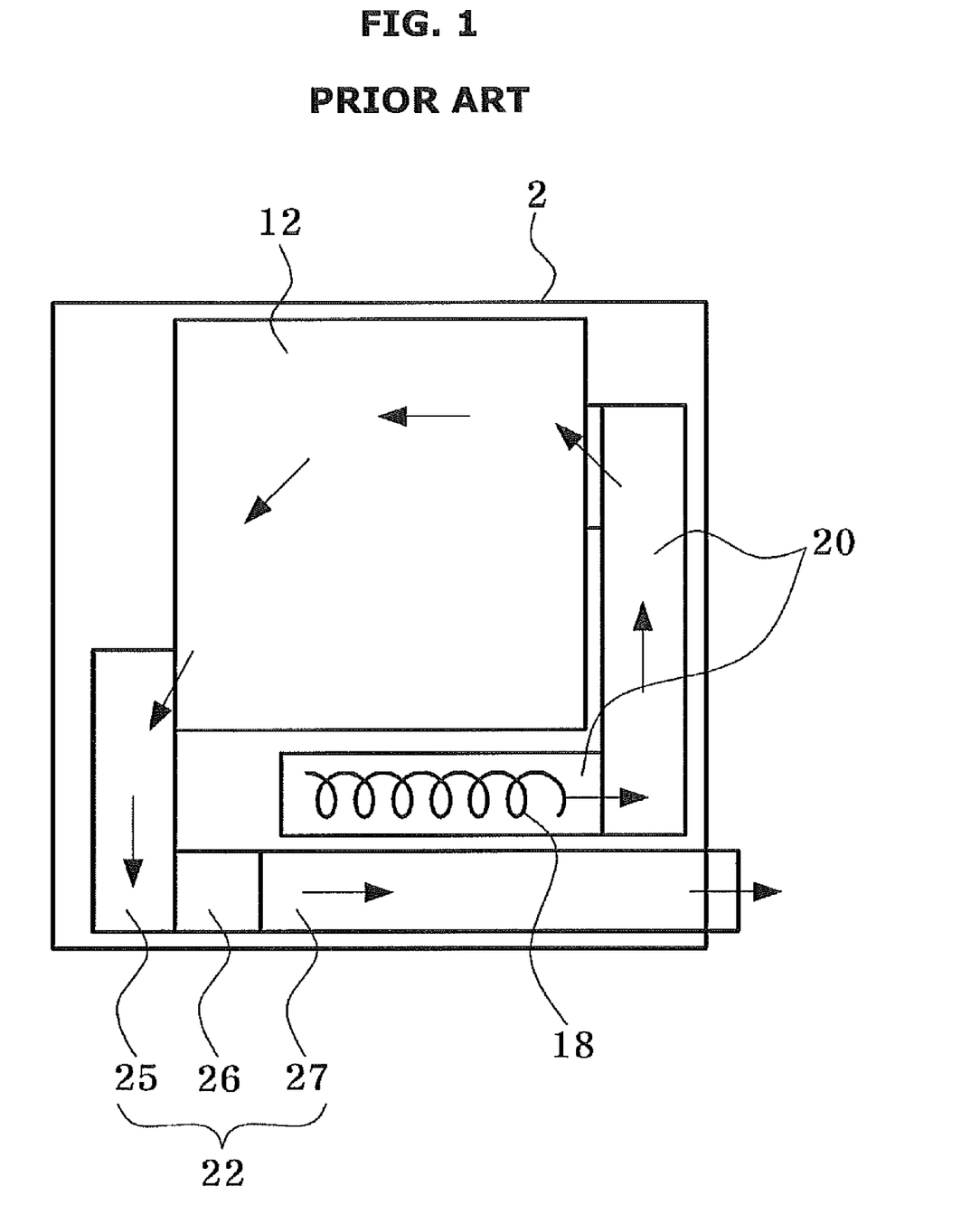
FIG. 1 is a structural view showing a flow path of a conventional dryer.
Figure 2:
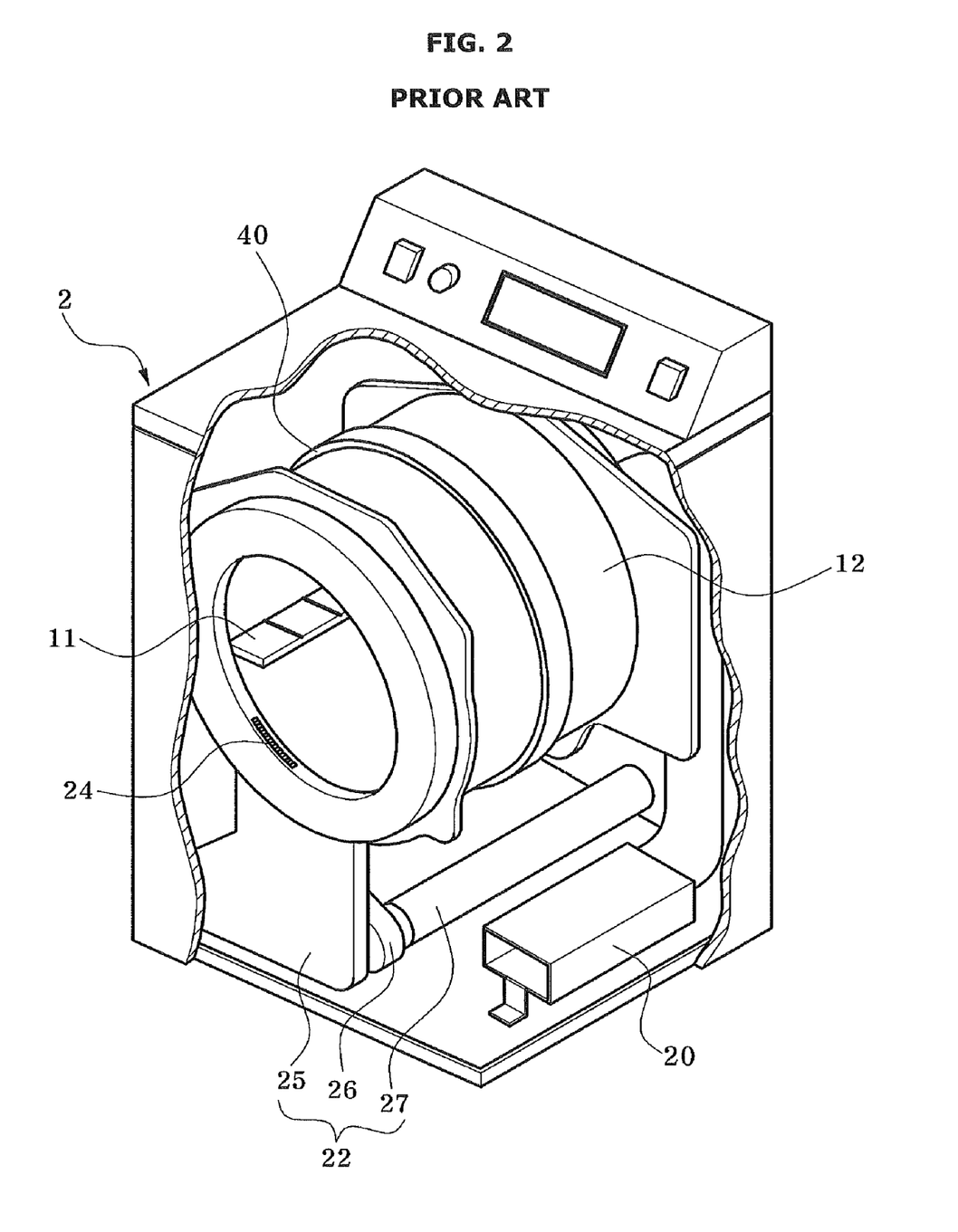
FIG. 2 is a partially broken perspective view of the conventional dryer.

FIG. 1 is a structural view showing a flow path of a conventional dryer and FIG. 2 is a partially broken perspective view of the conventional dryer.

Referring to FIGS. 1 and 2, the conventional dryer includes a cabinet 2 which forms an external appearance of the dryer and provided with an opening formed in front thereof and through which laundries to be dried are put into the dryer, a drum 12 which is rotatably mounted inside the cabinet 2 to accommodate the laundries to be dried and has opened front and rear portions for allowing air to pass therethrough, a heater 18 which heats the air sucked into the cabinet 2, an intake duct 20 which guides the heated air passed through the heater 18 to the rear of the drum 12, an exhaust unit 22 which exhausts the air polluted by drying the laundries to the outside of the cabinet 2, a blower fan (not shown) which is installed in the exhaust unit 22, and a motor (not shown) and a belt 40 which drive the drum 12 and the blow fan to be rotated.

A lifter 11 is mounted on an inner peripheral surface of the drum 12 to lift up and drop the laundries to be dried.

The exhaust unit 22 includes a lint duct 25 which filters foreign substances from the air by a filter 24 mounted therein, a fan housing 26 which communicates with the lint duct 25 and houses the blower fan and an exhaust duct 27 which communicates with the fan housing 26 at one end thereof and extends to the outside of the cabinet 2 at the other end.

Operation of the conventional dryer having the above described structure will be described.

By operating the dryer after putting the laundries to be dried into the drum 12 and closing a door (not shown), the motor is driven to rotate the drum 12 and the blower fan, and the heater 18 is operated together.

As the drum 12 is rotated, the laundries to be dried in the drum 12 are lifted up and dropped by the lifter 11.

External air is sucked in the heater 18, heated to air with high temperature and low humidity and then supplied to the inside of the drum 12 through the intake duct 20.

The air with high temperature and low humidity supplied to the inside of the drum 12 is brought into contact with the laundries to dry the laundries. As the dry process goes on, the supplied air is gradually changed to air with low temperature and high humidity, moved to the front of the drum 12 and then exhausted to the outside of the dryer through the exhaust unit 22.

Since the conventional mixing pipe is divided into a mixing pipe for Liquefied Petroleum Gas (LPG) and a mixing pipe for Liquefied Natural Gas (LNG), separate mixing pipes should be manufactured according to the kind of the gas. Therefore, there are problems that it is difficult to reduce cost taken to manufacture the gas heater and it is not easy to install the dryer. Therefore, it is required to improve the problems.

SUMMARY OF THE INVENTION

Embodiments of the present invention are directed to a mixing pipe for a gas heater which can be commonly used regardless of kinds of the gas.

In one embodiment, a mixing pipe for a gas heater includes an intake port through which gas and air are flowed in; a discharge port through which the gas and the air flowed in through the intake port are mixed and discharged; and an acceleration part disposed between the intake port and the discharge port and having a diameter smaller than the a diameter of the intake port, wherein a distance between the intake port and the acceleration part is greater than 0.5 times of the diameter of the acceleration part and smaller than 1.5 times of the diameter of the acceleration part.

Preferably, the distance between the intake port and the acceleration part is greater than 0.9 times of the diameter of the acceleration part and smaller than 1.15 times of the diameter of the acceleration part.

Preferably, the mixing pipe includes an upper panel provided with a first curved part which is upwardly bulged; and a lower panel provided with a second curved part which is downwardly bulged to correspond to the first curved part.

More preferably, a joining part formed by joining the upper panel and the lower panel has a bended part formed by bending joined ends of the upper panel and the lower panel in one direction.

More preferably, the joining part has a slant face formed by bending an edge of the joining part and a recess part formed at a side of the slant face.

In another embodiment, a mixing pipe for a gas heater includes an intake port through which gas and air are flowed in; a discharge port through which the gas and the air flowed in through the intake port are mixed and discharged; and an acceleration part disposed between the intake port and the discharge port and having a diameter smaller than the a diameter of the intake port, wherein a distance between the discharge port and the acceleration part is greater than 8.0 times of the diameter of the acceleration part and smaller than 10.0 times of the diameter of the acceleration part.

Preferably, the distance between the discharge port and the acceleration part is greater than 8.7 times of the diameter of the acceleration part and smaller than 9.3 times of the diameter of the acceleration part.

Preferably, the mixing pipe includes an upper panel provided with a first curved part which is upwardly bulged; and a lower panel provided with a second curved part which is downwardly bulged to correspond to the first curved part.

More preferably, a joining part formed by joining the upper panel and the lower panel has a bended part formed by bending joined ends of the upper panel and the lower panel in one direction.

More preferably, the joining part has a slant face formed by bending an edge of the joining part and a recess part formed at a side of the slant face.

In another embodiment, a mixing pipe for a gas heater includes an intake port through which gas and air are flowed in; a discharge port through which the gas and the air flowed in through the intake port are mixed and discharged; and an acceleration part disposed between the intake port and the discharge port and having a diameter smaller than the a diameter of the intake port, wherein a distance between the intake port and the acceleration part is greater than 0.5 times of the diameter of the acceleration part and smaller than 1.5 times of the diameter of the acceleration part; and a distance between the discharge port and the acceleration part is greater than 8.0 times of the diameter of the acceleration part and smaller than 10.0 times of the diameter of the acceleration part.

Preferably, the distance between the intake port and the acceleration part is greater than 0.9 times of the diameter of the acceleration part and smaller than 1.15 times of the diameter of the acceleration part.

Preferably, the distance between the discharge port and the acceleration part is greater than 8.7 times of the diameter of the acceleration part and smaller than 9.3 times of the diameter of the acceleration part.

Preferably, the mixing pipe includes an upper panel provided with a first curved part which is upwardly bulged; and a lower panel provided with a second curved part which is downwardly bulged to correspond to the first curved part.

More preferably, a joining part formed by joining the upper panel and the lower panel has a bended part formed by bending joined ends of the upper panel and the lower panel in one direction.

More preferably, the joining part has a slant face formed by bending an edge of the joining part and a recess part formed at a side of the slant face.

According to the present invention, it is possible to manufacture a common mixing pipe adapted to be applied to various kinds of gas and thus reduce manufacturing time and cost by improving the distance between the intake port and the acceleration part and the distance between the discharge port and the acceleration part.

Also, according to the present invention, since the mixing pipe is formed by bring the upper panel and the lower panel into close contact with each other and seaming them, no separate mold is needed and thus it is possible to reduce the manufacturing time and cost.

Further, according to the present invention, since the mixing pipe is formed with a slant face and recess part, it is possible to prevent an interference generated between the ends of the panels which are folded upon the seaming process and resultant generation of a gap between the upper panel and the lower panel.

DESCRIPTION OF SPECIFIC EMBODIMENTS

Hereinafter, an exemplary embodiment of the present invention will be described with reference to accompanying drawings. For convenience of description, a mixing pipe for a gas heater of a dryer will be described by way of example. It should be noted that the drawings are not to precise scale and may be exaggerated in thickness of lines or size of components for the purpose of convenience and clarity only.

Furthermore, terms used herein are defined in consideration of functions in the present invention and can be changed according to the custom or intention of users or operators. Thus, definition of such terms should be determined according to overall disclosures set forth herein.

Figure 3:
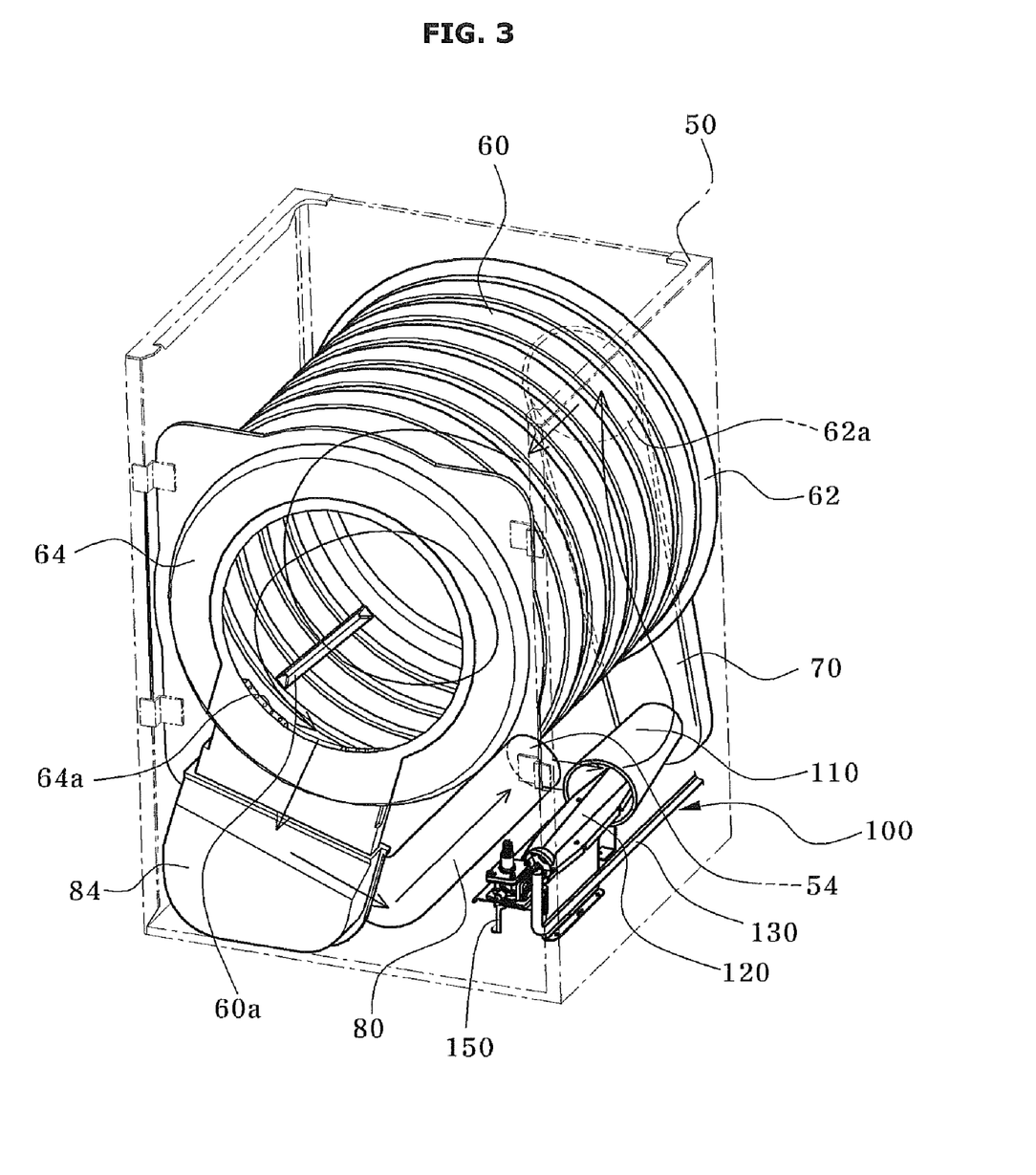
FIG. 3 is a structural view illustrating a dryer having a mixing pipe for a gas heater in accordance with an embodiment of the present invention.
Figure 4:
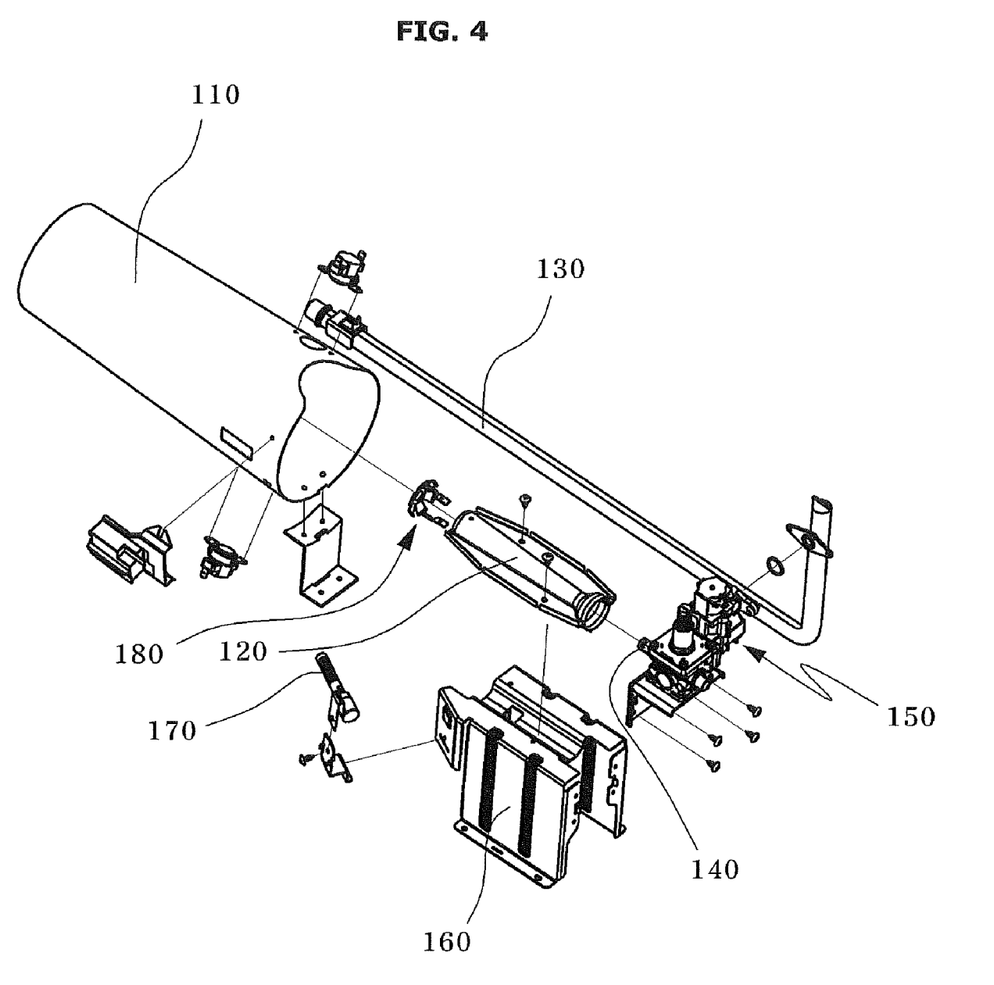
FIG. 4 is an exploded perspective view illustrating a gas heater used in an embodiment of the present invention.
Figure 5:
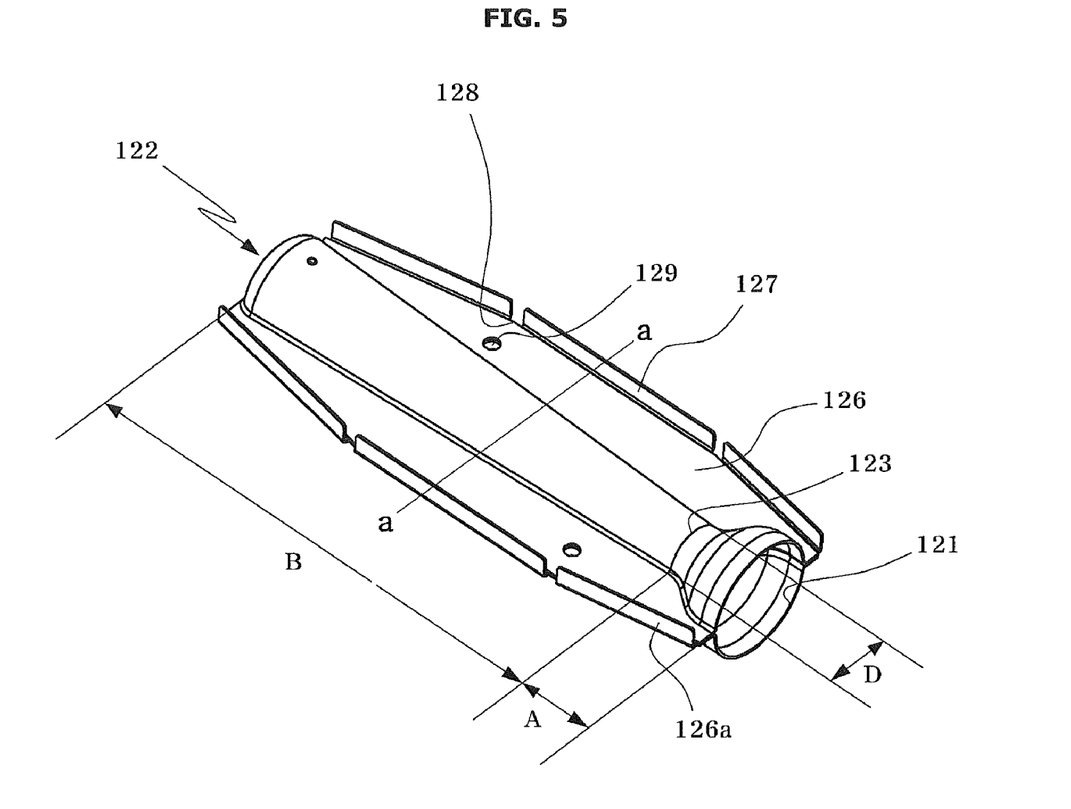
FIG. 5 is a perspective view illustrating a mixing pipe for a gas heater in accordance with an embodiment of the present invention.
Figure 6:
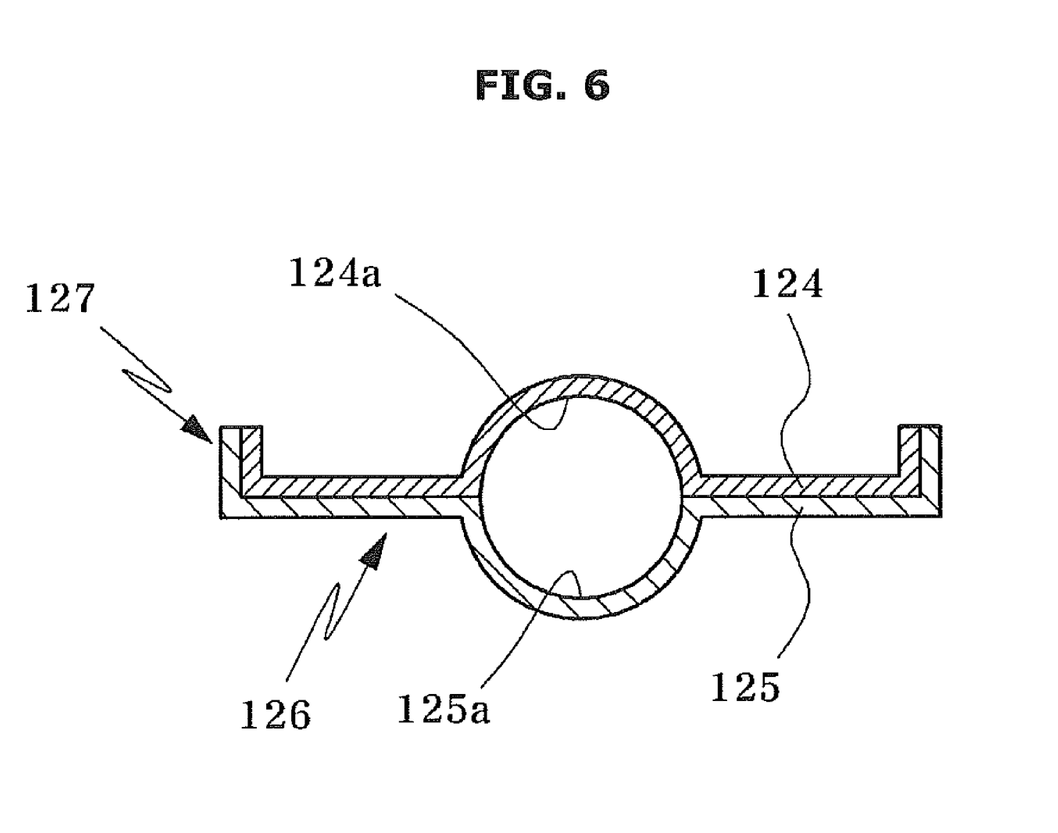
FIG. 6 is a cross-sectional view taken along a line a-a in FIG. 5.

FIG. 3 is a structural view illustrating a dryer having a mixing pipe for a gas heater in accordance with an embodiment of the present invention; FIG. 4 is an exploded perspective view illustrating a gas heater used in an embodiment of the present invention; FIG. 5 is a perspective view illustrating a mixing pipe for a gas heater in accordance with an embodiment of the present invention; and FIG. 6 is a cross-sectional view taken along a line a-a in FIG. 5.

Figure 7:
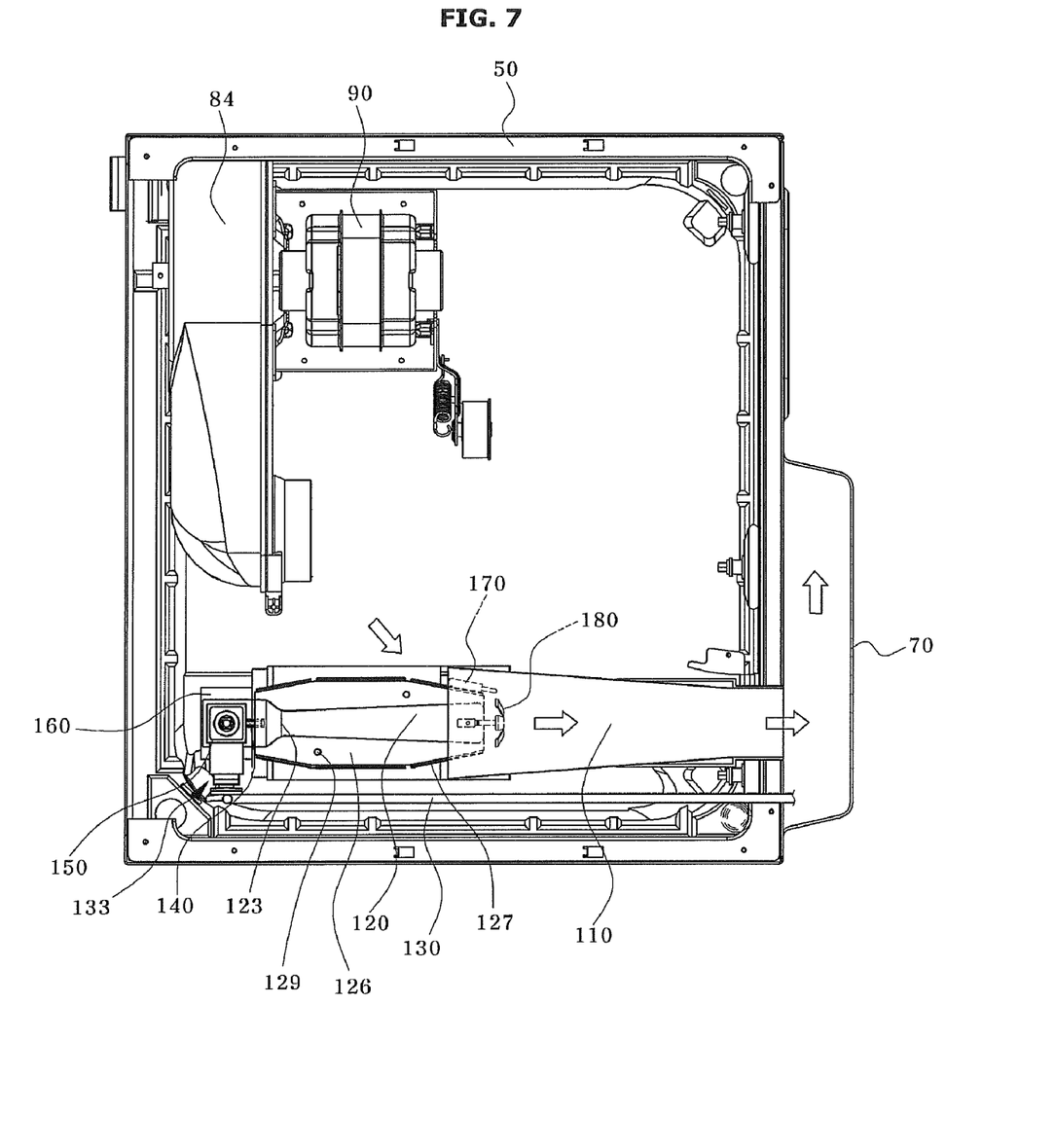
FIG. 7 is a plan view illustrating a intake flow path of the dryer having the mixing pipe for a gas heater in accordance with an embodiment of the present invention.
Figure 8:
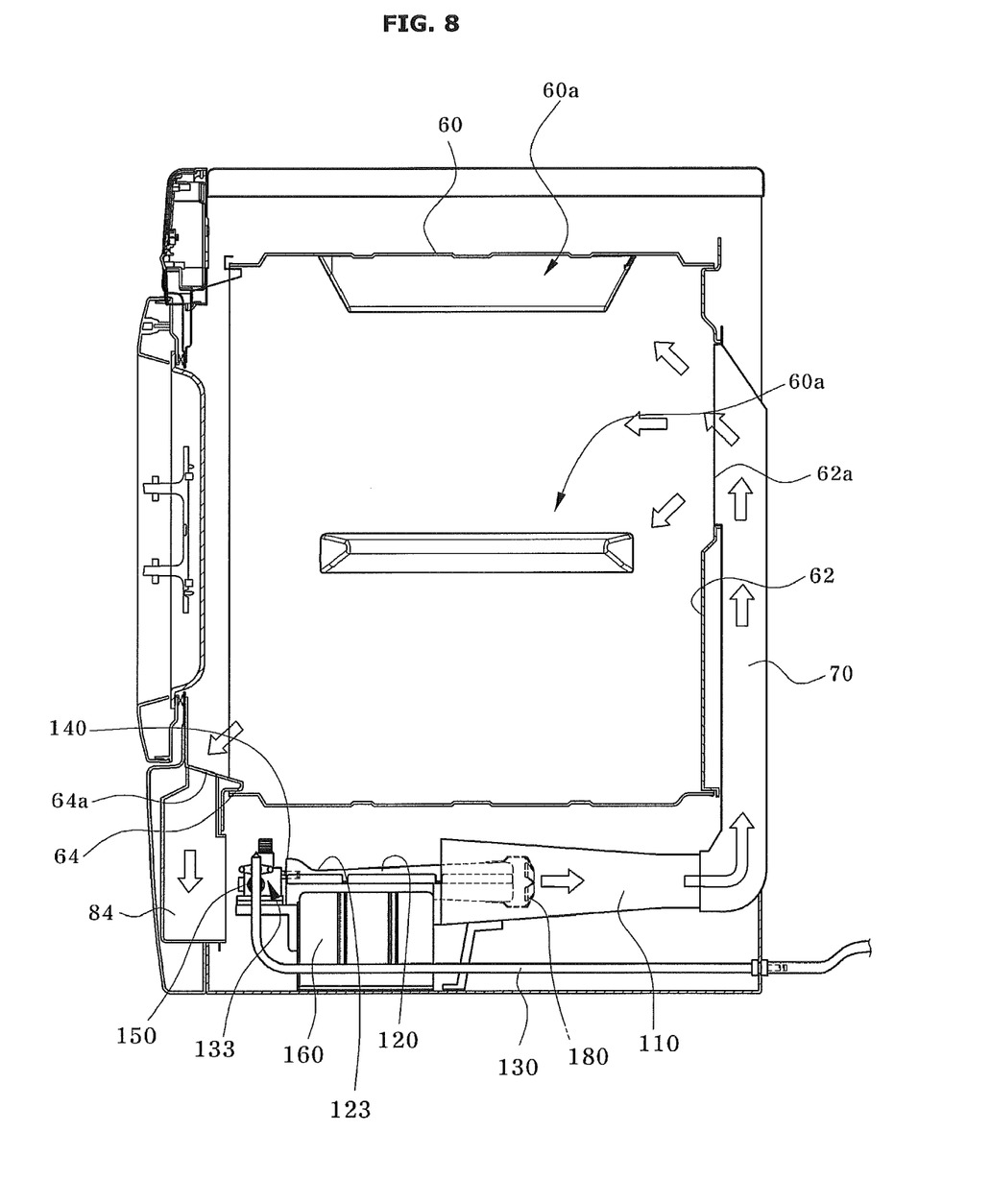
FIG. 8 is a side sectional view illustrating a circulation flow path of the dryer having the mixing pipe for a gas heater in accordance with an embodiment of the present invention.
Figure 9:
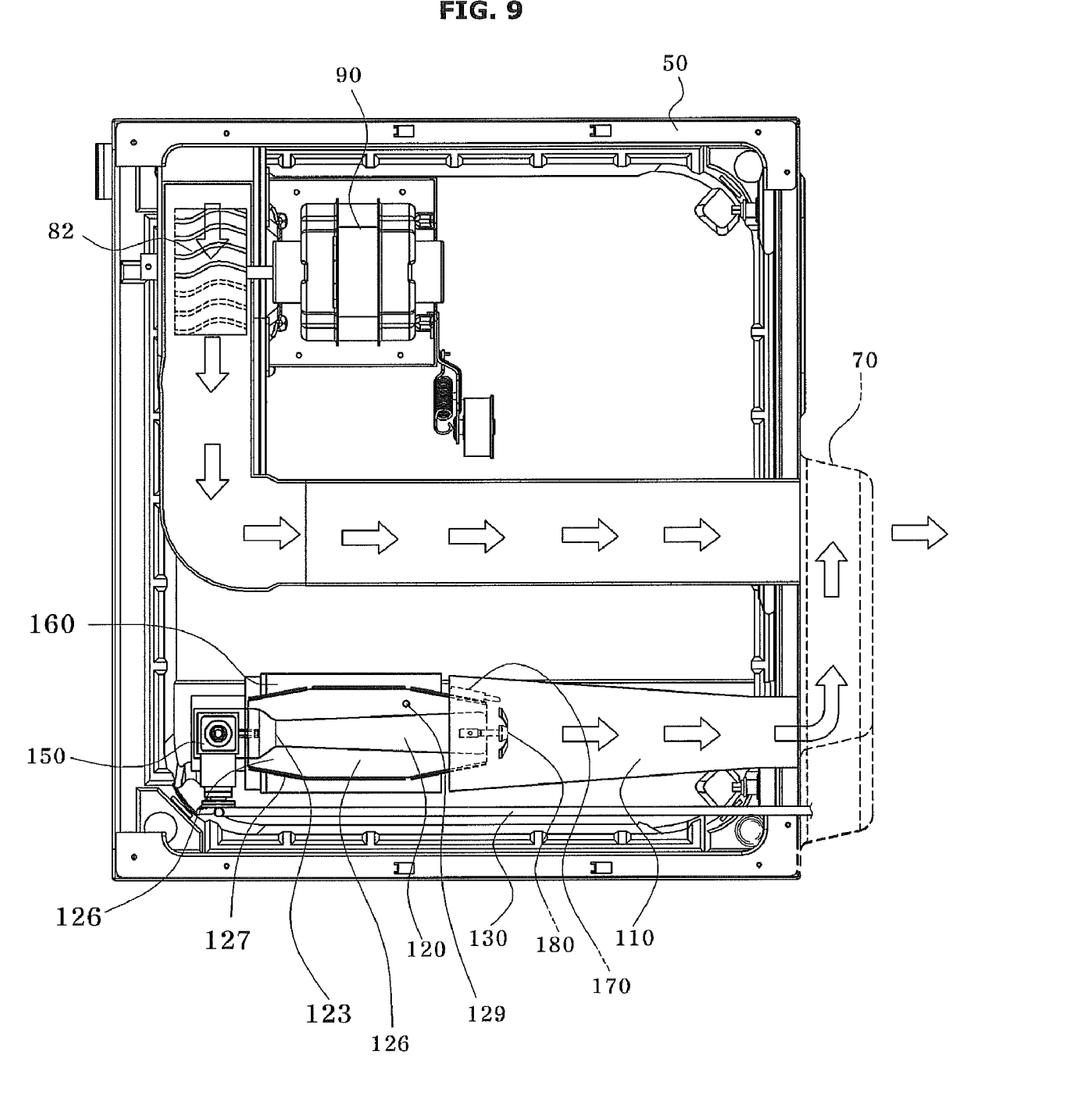
FIG. 9 is a plan view illustrating an exhaust flow path of the dryer having the mixing pipe for a gas heater in accordance with an embodiment of the present invention.

FIG. 7 is a plan view illustrating a intake flow path of the dryer having the mixing pipe for a gas heater in accordance with an embodiment of the present invention; FIG. 8 is a side sectional view illustrating a circulation flow path of the dryer having the mixing pipe for a gas heater in accordance with an embodiment of the present invention; and FIG. 9 is a plan view illustrating an exhaust flow path of the dryer having the mixing pipe for a gas heater in accordance with an embodiment of the present invention.

Referring to FIGS. 3 to 9, a dryer in accordance with an embodiment of the present invention includes a cabinet 50 which has a predetermined space therein and is provided with an opening and discharge port 54, a drum 60 which is rotatably mounted in an inside of the cabinet 50 to accommodate the laundries to be dried, a lifter 60*a* which is mounted on an inner wall of the drum 60 to lift up the laundries to be dried, an intake duct 70 which guides air inside the cabinet 50 to the inside of the drum 60, a gas heater 100 installed in the intake duct 70, an exhaust fan 82 (refer to FIG. 8) which is provided between the drum 60 and the discharge port 54, an exhaust duct 80 which is provided between the exhaust fan 82 and the discharge port 54 and a driving motor 90 (refer to FIG. 8) which is connected with a rotation shaft of the exhaust fan 82.

When power is applied to the driving motor 90, the exhaust fan 82 is rotated to circulate air and the air flowed in the inside of the cabinet 50 is changed to high temperature air while passing the gas heater 100.

The air is supplied to the inside of the drum 60 along the intake duct 70 and is brought into contact with the laundries to perform drying operation or sterilizing operation.

After that, the air exhausted by the exhaust fan 82 is flowed along the exhaust duct 80 and exhausted to an outside through the discharge port 54 of the cabinet 50, thereby completing the circulation of the air.

The drum 60 is formed in a cylindrical shape with opened front portion, which corresponds to the opening, and rear portion, and is rotatably mounted to a support panel 62 which is formed with a through hole part 62*a*.

The support panel 62 is mounted at a rear side of the cabinet 50 to rotatably support the drum 60. Also, the through hole part 62*a* of the support panel 62 is communicated with the intake duct 70.

A front panel 64 is installed between the front end portion of the drum 60 and the opening of the cabinet 50 and is formed with an exhaust hole 64*a* at a lower end portion thereof.

The exhaust hole 64*a* is connected with a connection duct 84 which is extended toward the exhaust fan 82, and a housing (not shown) for housing the exhaust fan 82 therein is placed between the connection duct 84 and the exhaust duct 80.

The intake duct 70 is extended from the gas heater 100 to the through hole part 62*a*. Therefore, the air is changed to air having a temperature higher than a predetermined temperature while passing through the gas heater 100 and flowed along the intake duct 70 to be supplied to the inside of the drum 60 through the through hole part 62a.

At this time, since a contact area between the high temperature air and the laundries to be dried is increased as the drum 60 connected with the driving motor 90 by a belt (not shown) is rotated, the efficiency of the drying and sterilizing operation is enhanced.

The gas heater 100 includes a gas pipe 130 for supplying gas, a valve 150 for controlling supply and cutoff of the gas and an amount of the supplied gas, a nozzle 140 provided at a side of the valve 150, a mixing pipe 120 placed corresponding to the nozzle 140 to mix the gas and the air, an ignition plug 170 mounted on the mixing pipe 120 to generate sparks, a guide duct 110 placed at an outside of the mixing pipe 120 to guide the heated air, a bracket 160 for mounting the mixing pipe 120 to the cabinet 50, and a flame holder 180 placed in the mixing pipe 120 to prevent that a flame produced by the ignition plug 170 becomes larger than a predetermined size.

As the valve 150 is opened, the gas is supplied to the mixing pipe 120 along the gas pipe 130. Then, the gas is mixed with the air inside the cabinet 50 and injected to the outside of the mixing pipe 120 and the flame is produced by the sparks generated in the ignition plug 170.

Size and production position of the flame are controlled by the flame holder 180, so that the flame is placed inside the guide duct 110. The air flowed in along the guide duct 110 is changed to a hot wind with a high temperature while passing through the flame.

The bracket 160 has a grove part which is formed at an upper face thereof and in which the mixing pipe 120 is seated, and a fixing face which is formed at a rear side (left side in FIG. 4) and on which the ignition plug 170 is mounted, and the bracket 160 is mounted on a bottom surface of the cabinet 50. Also, the valve 150 is mounted on the bracket 160 by a fixing piece.

The mixing pipe 120 includes an intake port 121 through which the gas and the air are flowed in, a discharge port 122 through which the gas and the air flowed in through the intake port 121 are mixed and discharged and an acceleration part 123 disposed between the intake port 121 and the discharge port 122 and having a diameter smaller than the a diameter of the intake port 121 to increase the flow velocity of the gas and the air.

Since the intake port 121 has the diameter greater than that of the nozzle 140, the gas injected from the nozzle 140 and the air flowed in through a gap between the nozzle 140 and the intake port 121 are mixed in the inside the mixing pipe 120.

A distance A between the intake port 121 and the acceleration part 123 is greater than 0.5 times of the diameter D of the acceleration part 123 and smaller than 1.5 times of the diameter D of the acceleration part 123. Also, a distance B between the discharge port 122 and the acceleration part 123 is greater than 8.0 times of the diameter D of the acceleration part 123 and smaller than 10.0 times of the diameter D of the acceleration part 123.

Preferably, the distance A between the intake port 121 and the acceleration part 123 is greater than 0.9 times of the diameter D of the acceleration part 123 and smaller than 1.15 times of the diameter D of the acceleration part 123. Also, the distance B between the discharge port 122 and the acceleration part 123 is greater than 8.7 times of the diameter D of the acceleration part 123 and smaller than 9.3 times of the diameter D of the acceleration part 123.

This dimensional delimiting is for obtaining the mixing pipe 120 which allows common use of LPG and LNG. The aforementioned dimensions are determined on the basis of shape, color or the like of the produced flame after the use of the LPG and the LNG in turn while varying the dimension of the mixing pipe 120.

The mixing pipe 120 includes an upper panel 124 provided with a first curved part 124a which is upwardly bulged, and a lower panel 125 coupled with the upper panel 124 and provided with a second curved part 125a which corresponds to the first curved part 124a and is downwardly bulged.

According to the aforementioned structure, there is no need to manufacture a high cost mold for manufacturing the mixing pipe 120 and it is possible to manufacture the mixing pipe 120 by performing only a press process for manufacturing the upper panel 124 and the lower panel 125 and a seeming process for bring the upper panel 124 and the lower panel 125 into close contact with each other to assemble them, thereby capable of reducing a manufacturing cost.

Also, the mixing pipe 120 is provided with a joining part 126 which is formed by joining the upper panel 124 and the lower panel 125, and the joining part 126 is formed with a bended part 127 formed by bending joined ends of the upper panel 124 and the lower panel 125 in one direction.

Since formation of a gap between the upper panel 124 and the lower panel 125 is prevented as the bended part 127 is formed, leakage of the gas passing through the mixing pipe 120 is prevented.

The joining part 126 is formed with a slant face 126a formed by bending the edge of the joining part 126. Since a width of the joining part 126 is reduced by the formation of the slant face 126a, the mixing pipe 120 can be easily inserted in the guide duct 110 and an interference between the mixing pipe 120 and the gas pipe 130 or the valve 150 is prevented when the mixing pipe 120 is mounted on the bracket 160.

Since a recess part 128 is formed at a portion from which the slant face 126a begins, it is possible to prevent that, when performing the seaming process for bending the end of the joining part 126, the end of the slant face 126a and the end of the bended part 127 are overlapped with each other to form folds and thus a gap is formed between the upper panel 124 and the lower panel 125.

Also, since the lower panel 125 is formed longer than the upper panel 124, it is possible to prevent that, when performing the seaming process for bending the end of the joining part 126, the lower panel 125 is deformed and thus the first curved part 124a and the second curved part 125a are spaced apart from each other. Therefore, it is possible to prevent that a gap is formed between the upper panel 124 and the lower panel 125.

The joining part 126 is formed with more than two mounting hole parts 129 and coupled to the bracket 160 at the exact position thereof through the mounting hole parts 129 by fastening members.

Hereinafter, operation of the mixing pipe for a gas heater and the dryer having the same in accordance with an embodiment of the present invention will be described.

When a user manipulates an operation button (not shown), the power is applied to the driving motor 90 to rotate the exhaust fan 82 and the drum 60.

By the driving of the exhaust fan 82, the air flowed in the inside of the cabinet 50 is moved to an upside of the cabinet 50 along the intake duct 70 vertically formed on a rear face of the cabinet 50.

When the valve 150 is opened, gas supplying along the gas pipe 130 is begun and the supplied gas passes through the nozzle 140 to be injected to the inside of the mixing pipe 120.

The gas is primarily mixed with the air flowed in through the nozzle 140 and secondarily mixed with the air flowed in through the space between the mixing pipe 120 and the nozzle 140.

The mixture of the air and gas is injected through the mixing pipe 120 and a flame is produced by operation of the ignition plug 170.

At this time, since the injected mixture collides with the flame to form a vortex, the flame is laterally spread in the vicinity of the flame holder 180.

The air flowed in the inside of the intake duct 70 along the guide duct 110 is heated to dry air with a high temperature higher than a predetermined temperature.

After that, the air flowed in the inside of the drum 60 through the through hole part 62a is swirled to dry the laundries to be dried. The front panel 64 placed between the front end portion of the drum 60 and the opening of the cabinet 50 and is formed with an exhaust hole 64a and the air which finished the dry operation is exhausted to the outside of the drum 60 through the exhaust hole 64a.

After that, the air is flowed to the exhaust fan 82 through the connection duct 84 communicated with the exhaust hole 64a, then move from the exhaust fan 82 along the exhaust duct 80 and exhausted to the outside of the cabinet 50 through the discharge port 54.

The following is operation of the gas heater 100. The valve 150 is opened with the beginning of the dry operation and the gas injected to the mixing pipe 120 through the nozzle 140 is primarily mixed with the air flowed in through the nozzle 140.

After that, the secondary mixing is performed as the air flowed in through the intake port 121 of the mixing pipe 120 and the primarily mixed mixture are mixed.

At this time, since the distance A between the intake port 121 and the acceleration part 123, distance B between the discharge port 122 and the acceleration part 123 and the diameter D of the acceleration part 123 are improved as described above, it is possible to manufacture a common mixing pipe which is adapted to be applied to various kinds of gas.

The mixture is injected to the outside of the mixing pipe 120 and the flame is produced by the ignition plug 170 to supply thermal energy to the air supplied to the intake duct 70.

Also, this flame is gathered in a middle of the guide duct 110 by the flame holder 180 to prevent the deformation or damage of the mixing pipe 120 and the intake duct 70.

Although the present invention has been described with reference to the embodiments shown in the drawings, it should be understood that these embodiments are provided for illustrative purpose and that various equivalent modifications and alterations will be apparent to those skilled in the art without departing from the scope and spirit of this invention.

In addition, although the present invention has been described with reference to the dryer as specifically described herein, it should be noted that the dryer has been illustrated by way of example, and that the mixing pipe of the present invention may be applied to a gas heater of other product, without being limited to the dryer in its application.

Therefore, the scope and spirit of the invention is limited only by the claims set forth herein as follows.

What is claimed is:

1. A mixing pipe for a gas heater, comprising:
    an intake port through which gas and air are flowed in;
    a discharge port through which the gas and the air flowed in through the intake port are mixed and discharged;
    an acceleration part disposed between the intake port and the discharge port and having a diameter smaller than a diameter of the intake port;
    an upper panel provided with a first curved part which is upwardly bulged; and
    a lower panel provided with a second curved part which is downwardly bulged to correspond to the first curved part;
    wherein a joining part formed by joining the upper panel and the lower panel has a bended part formed by bending joined ends of the upper panel and the lower panel in one direction;
    wherein a distance between the intake port and the acceleration part is greater than 0.5 times of the diameter of the acceleration part and smaller than 1.5 times of the diameter of the acceleration part.

2. The mixing pipe of claim 1, wherein the distance between the intake port and the acceleration part is greater than 0.9 times of the diameter of the acceleration part and smaller than 1.15 times of the diameter of the acceleration part.

3. The mixing pipe of claim 1, wherein the joining part has a slant face formed by bending an edge of the joining part and a recess part formed at a side of the slant face.

4. A mixing pipe for a gas heater, comprising:
    an intake port through which gas and air are flowed in;
    a discharge port through which the gas and the air flowed in through the intake port are mixed and discharged;
    an acceleration part disposed between the intake port and the discharge port and having a diameter smaller than a diameter of the intake port;
    an upper panel provided with a first curved part which is upwardly bulged; and
    a lower panel provided with a second curved part which is downwardly bulged to correspond to the first curved part;
    wherein a joining part formed by joining the upper panel and the lower panel has a bended part formed by bending joined ends of the upper panel and the lower panel in one direction;
    wherein a distance between the discharge port and the acceleration part is greater than 8.0 times of the diameter of the acceleration part and smaller than 10.0 times of the diameter of the acceleration part.

5. The mixing pipe of claim 4, wherein the distance between the discharge port and the acceleration part is greater than 8.7 times of the diameter of the acceleration part and smaller than 9.3 times of the diameter of the acceleration part.

6. The mixing pipe of claim 4, wherein the joining part has a slant face formed by bending an edge of the joining part and a recess part formed at a side of the slant face.

7. A mixing pipe for a gas heater, comprising:
    an intake port through which gas and air are flowed in;
    a discharge port through which the gas and the air flowed in through the intake port are mixed and discharged;
    an acceleration part disposed between the intake port and the discharge port and having a diameter smaller than a diameter of the intake port;
    an upper panel provided with a first curved part which is upwardly bulged; and
    a lower panel provided with a second curved part which is downwardly bulged to correspond to the first curved part;
    wherein a joining part formed by joining the upper panel and the lower panel has a bended part formed by bending joined ends of the upper panel and the lower panel in one direction.
    wherein a distance between the intake port and the acceleration part is greater than 0.5 times of the diameter of the acceleration part and smaller than 1.5 times of the diameter of the acceleration part; and wherein a distance between the discharge port and the acceleration part is greater than 8.0 times of the diameter of the acceleration part and smaller than 10.0 times of the diameter of the acceleration part.

8. The mixing pipe of claim 7, wherein the distance between the intake port and the acceleration part is greater than 0.9 times of the diameter of the acceleration part and smaller than 1.15 times of the diameter of the acceleration part, further wherein the distance between the discharge port and the acceleration part is greater than 8.7 times of the diameter of the acceleration part and smaller than 9.3 times of the diameter of the acceleration part.

9. The mixing pipe of claim 7, wherein the joining part has a slant face formed by bending an edge of the joining part and a recess part formed at a side of the slant face.

* * * * *